(12) United States Patent
Ossman

(10) Patent No.: US 7,480,312 B2
(45) Date of Patent: Jan. 20, 2009

(54) NETWORK TRAFFIC ACCELERATOR SYSTEM AND METHOD

(75) Inventor: Valentin Ossman, Netanya (IL)

(73) Assignee: Tehuti Networks Ltd., Haifa (IL)

( * ) Notice: Subject to any disclaimer, the term of this patent is extended or adjusted under 35 U.S.C. 154(b) by 1322 days.

(21) Appl. No.: 10/642,741

(22) Filed: Aug. 19, 2003

(65) Prior Publication Data

US 2004/0042487 A1 Mar. 4, 2004

Related U.S. Application Data

(60) Provisional application No. 60/404,295, filed on Aug. 19, 2002.

(51) Int. Cl.
*H04J 3/16* (2006.01)
(52) U.S. Cl. ............... 370/469; 370/474; 709/235
(58) Field of Classification Search ............. 370/465, 370/466, 469, 471, 474, 475, 476; 709/226, 709/230, 250
See application file for complete search history.

(56) References Cited

U.S. PATENT DOCUMENTS

| | | | | |
|---|---|---|---|---|
| 6,122,670 | A * | 9/2000 | Bennett et al. ............ | 709/236 |
| 6,434,620 | B1 | 8/2002 | Boucher et al. | |
| 6,591,302 | B2 | 7/2003 | Boucher et al. | |
| 7,149,817 | B2 * | 12/2006 | Pettey ..................... | 709/250 |
| 7,167,927 | B2 * | 1/2007 | Philbrick et al. ........... | 709/250 |
| 2002/0095519 | A1 * | 7/2002 | Philbrick et al. ........... | 709/250 |
| 2002/0161919 | A1 * | 10/2002 | Boucher et al. ............ | 709/238 |
| 2003/0200315 | A1 * | 10/2003 | Goldenberg et al. ........ | 709/225 |
| 2004/0003126 | A1 * | 1/2004 | Boucher et al. ............ | 709/250 |
| 2004/0148382 | A1 * | 7/2004 | Narad et al. ............... | 709/223 |
| 2005/0122980 | A1 * | 6/2005 | Anand et al. ............ | 370/395.4 |
| 2007/0064725 | A1 * | 3/2007 | Minami et al. ............ | 370/463 |
| 2007/0067497 | A1 * | 3/2007 | Craft et al. ................ | 709/250 |
| 2008/0056253 | A1 * | 3/2008 | Minami et al. ............ | 370/389 |

OTHER PUBLICATIONS

Computer Networks, Tanenbaum A.S., 4th edition.
http://www.ietf.org/rfc.html RFC 793, 1122, 791, 826, 1042, 792.
http://www.pcisig.com/home.

* cited by examiner

*Primary Examiner*—Chi H. Pham
*Assistant Examiner*—Kevin Mew
(74) *Attorney, Agent, or Firm*—Mark M. Friedman

(57) ABSTRACT

A network traffic accelerator (NTA) in a TCP/IP communication network comprises a hardware implemented internal network layer, transport layer and data link layer, and is configured to process protocol-supported or protocol-unsupported packets. Both protocol-supported and protocol-unsupported packets may originate from internal or external layers. The NTA includes means to merge such internally and externally originated packages into an internal receive or an internal transmit path, means to split transmit packets between two paths through two data link layers, and means to direct protocol-unsupported packets for external processing.

11 Claims, 11 Drawing Sheets

NETWORK TRAFFIC ACCELERATOR SYSTEM AND METHOD

CROSS REFERENCE TO EXISTING APPLICATIONS

This application claims priority to U.S. Provisional Patent Application No. 60/404,295 filed Aug. 19, 2002, the content of which is hereby incorporated by reference.

FIELD OF THE INVENTION

The present invention relates to communication networks, and more particularly to network traffic acceleration platforms implemented in hardware. Specifically, the present invention discloses a programmable platform for packet processing acceleration, by means of tasks offloaded form a host system and performed in a separate hardware system. These tasks may include network protocol handling, Fire-Wall filtering, and security and compression algorithms handling.

BACKGROUND OF THE INVENTION

The rapid growth of computer networks in the past decade has brought, in addition to well known advantages, dislocations and bottlenecks in utilizing conventional network devices. For example, a CPU of a computer connected to a network may spend an increasing proportion of its time processing network communications, leaving less time available for other work. In particular, file data exchanges between the network and a storage unit of the computer, such as a disk drive, are performed by dividing the data into packets for transportation over the network. Each packet is encapsulated in layers of control information that are processed one layer at a time by the receiving computer CPU. Although the speed of CPUs has constantly increased, this type of protocol processing can consume most of the available processing power of the fastest commercially available CPU. A rough estimation indicates that in a Transmission Control Protocol (TCP)/Internet Protocol (IP) network, one currently needs one hertz of CPU processing speed to process one bit per second of network data. Furthermore, evolving technologies such as IP storage, streaming video and audio, online content, virtual private networks (VPN) and e-commerce, require data security and privacy like IP Security (IPSec), Secure Sockets Layer (SSL) and Transport Layer Security (TLS) that increase even more the computing demands from the CPU. Thus, the network traffic bottleneck has shifted from the physical network to the host CPU.

Most network computer communication is accomplished with the aid of layered software architecture for moving information between host computers connected to the network. The general functions of each layer are normally based on an international standard defined by the International Standards Organization (ISO), named the Open Systems Interconnection (OSI) network model. The OSI model sets forth seven processing layers through which information received by a host passes and made presentable to an end user. Similarly, those seven processing layers may be passed in reverse order during transmission of information from a host to the network.

It is well known that networks may include, for instance, a high-speed bus such as an Ethernet connection or an internet connection between disparate local area networks (LANs), each of which includes multiple hosts or any of a variety of other known means for data transfer between hosts. According to the OSI standard, Physical layers are connected to the network at respective hosts, providing transmission and receipt of raw data bits via the network. A Data Link layer is serviced by the Physical layer of each host, the Data Link layers providing frame division and error correction to the data received from the Physical layers, as well as processing acknowledgment frames sent by the receiving host. A Network layer of each host, used primarily for controlling size and coordination of subnets of packets of data, is serviced by respective Data Link layers. A Transport layer is serviced by each Network layer, and a Session layer is serviced by each Transport layer within each host. Transport layers accept data from their respective Session layers, and split the data into smaller units for transmission to Transport layers of other hosts, each such Transport layer concatenating the data for presentation to respective Presentation layers. Session layers allow for enhanced communication control between the hosts. Presentation layers are serviced by their respective Session layers, the Presentation layers translating between data semantics and syntax which may be peculiar to each host and standardized structures of data representation. Compression and/or encryption of data may also be accomplished at the Presentation level. Application layers are serviced by respective Presentation layers, the Application layers translating between programs particular to individual hosts and standardized programs for presentation to either an application or an end user.

The rules and conventions for each layer are called the protocol of that layer, and since the protocols and general functions of each layer are roughly equivalent in various hosts, it is useful to think of communication occurring directly between identical layers of different hosts, even though these peer layers do not directly communicate without information transferring sequentially through each layer below. Each lower layer performs a service for the layer immediately above it to help with processing the communicated information. Each layer saves the information for processing and service to the next layer. Due to the multiplicity of hardware and software architectures, devices, and programs commonly employed, each layer is necessary to insure that the data can make it to the intended destination in the appropriate form, regardless of variations in hardware and software that may intervene.

In preparing data for transmission from a first to a second host, some control data is added at each layer of the first host regarding the protocol of that layer, the control data being indistinguishable from the original (payload) data for all lower layers of that host. Thus an Application layer attaches an application header to the payload data, and sends the combined data to the Presentation layer of the sending host, which receives the combined data, operates on it, and adds a presentation header to the data, resulting in another combined data packet. The data resulting from combination of payload data, application header and presentation header is then passed to the Session layer, which performs required operations including attaching a session header to the data, and presenting the resulting combination of data to the transport layer. This process continues as the information moves to lower layers, with a transport header, network header and data link header and trailer attached to the data at each of those layers, with each step typically including data moving and copying, before sending the data as bit packets, over the network, to the second host.

The receiving host generally performs the reverse of the above-described process, beginning with receiving the bits from the network, as headers are removed and data processed in order from the lowest (Physical) layer to the highest (Application) layer before transmission to a destination of the receiving host. Each layer of the receiving host recognizes and manipulates only the headers associated with that layer, since, for that layer, the higher layer control data is included with and indistinguishable from the payload data. Multiple interrupts, valuable CPU processing time and repeated data copies may also be necessary for the receiving host to place the data in an appropriate form at its intended destination.

A fuller description of layered protocol processing may be found in textbooks such as "Computer Networks", Third Edition (1996) by Andrew S. Tanenbaum, which is incorporated herein by reference. As defined therein, a computer network is an interconnected collection of autonomous computers, such as internet and intranet devices, including local area networks (LANs), wide area networks (WANs), asynchronous transfer mode (ATM), ring or token ring, wired, wireless, satellite or other means for providing communication capability between separate processors. A computer is defined herein to include a device having both logic and memory functions for processing data, while computers or hosts connected to a network are said to be heterogeneous if they function according to different operating devices or communicate via different architectures.

As networks grow increasingly popular and the information communicated thereby becomes increasingly complex and copious, the need for such protocol processing has increased. It is estimated that a large fraction of the processing power of a host CPU may be devoted to controlling protocol processes, diminishing the ability of that CPU to perform other tasks. Network interface cards (NICs) have been developed to help with the lowest layers, such as the Physical and Data Link layers. It is also possible to increase protocol processing speed by simply adding more processing power or CPUs according to conventional arrangements. This solution, however, is both awkward and expensive. The complexities presented by various networks, protocols, architectures, operating devices and applications generally require extensive processing to afford communication capability between various network hosts.

The seven layer 0SI model is described schematically in FIG. 1. The seven layers are divided into two main groups: Lower Layers (Transport 106, Network 108, Data Link 110 and Physical 112) and Upper Layers (Application 100, Presentation 102 and Session 104). The initials in the parentheses of blocks 106, 108 and 110 are examples of protocols implemented in some systems in each particular layer. At present, the main protocols implemented in Network layer 108 are IP, Address Resolution Protocol (ARP) and Internet Control Message Protocol (ICMP). The main protocols implemented in Transport layer 106 are TCP and User Datagram Protocol (UDP). These protocols are cited hereinafter as by the common name of "TCP/IP" protocols. TCP is described in RFCs 793 and 1122, UDP is described in RFCs 768 and 1122, IP is described in RFCs 791 and 1122, ARP is described in RFCs 826 and 1042, and ICMP is described in RFCs 792 and 1122. The intention was to use these protocols at low bandwidth with low reliability network connections, and they were designed to increase the reliability of the network traffic, guaranteeing delivery and correct sequencing of the data being sent by an application implemented above them.

There are several known initiatives to implement the Network and the Transport layer protocols (especially the TCP/IP protocols) in hardware. For simplicity, implementation of a layer protocol will be referred to hereafter as "implementation of a layer". Two such initiatives are described in U.S. Pat. No. 6,434,620 "TCP/IP offload network interface device" and U.S. Pat. No. 6,591,302 "Fast-path apparatus for receiving data corresponding to a TCP connection", both to Alacritech Inc. Both implementations make use of two data paths from the network to the application, a "slow path" and a "fast path". These two paths cross two different implementations of the Network and Transport layers, as described in FIG. 11 of U.S. Pat. No. 6,434,620. The two implementations therein use respectively numbers 370 and 358 for the Transport layer, and 366 and 355 for the Network layer. However, the OSI model permits only one implementation of each Transport layer protocol (TCP in our case), because at the interface level between the Session layer and the Transport layer, the data received in the Transport layer from the Session layer includes an indication that specifies only the type of protocol. The Transport layer thus knows only the protocol type (TCP in our case) and lacks the information (found only in the Network layer) required to choose one of the two implementations of the protocol. Thus, the system described in the Alacritech patents is in conflict with the standard OSI model, and requires major changes in a system built based on the OSI model.

A typical implementation of the OSI model comprises hardware and software implemented protocols. FIG. 2 shows one such implementation schematically, again as a layer model. In FIG. 2, the seven layers marked 200-212 mirror the 100-112 marking of the same layers in FIG. 1. Protocols in layers 200-208 are implemented in a software section 251 and protocols in layers 210-212 are implemented in a hardware section 270. The hardware section comprises two NICs 260*a* and 260*b*. Each NIC comprises a hardware implemented Data Link layer (210*a* and 210*b*) and Physical layer (212*a* and 212*b*). Both NICs have the same functionality but can differ in the exact implementation. Two software drivers 214*a* and 214*b* couple between the software and the hardware sections.

FIG. 3 describes a common hardware implementation of the layer model described in FIG. 2. A CPU 350 performs the tasks of software section 250, i.e. the processing of the Lower Layers (Network and Transport) protocols and of the Upper Layers (Application, Presentation, and Session) protocols, as well as the function of drivers 214, see FIGS. 1, 2. Two NICs 360*a* and 360*b* perform the tasks of NICs 260*a* and 260*b* in FIG. 2, i.e. the processing of the Data Link layer and Physical layer protocols. A host bus 322 and a host bus bridge 320 are used to provide the connectivity between NICs 360*a*, 360*b* and CPU 350. The host bus may be any known bus, for example a PCI local bus as defined by the PCISIG group (http://www.pcisig.com). Each NIC is connected to, and allows communication between an Ethernet Network 324*a*, 324*b* and all other elements of the system.

The implementation described in FIGS. 2 and 3 divides the protocol processing load between CPU 350 and NICs 360*a* and 360*b*. The processing power required to process the Network 208 and Transport 206 layer protocols is high and proportional to the network throughput, limiting the available processing power left in the CPU for the Upper Layers (200, 202 and 204 in FIG. 2) protocols, especially for the Application layer ones. This is an unacceptable disadvantage.

FIG. 4 represents a typical hardware implementation of a TCP/IP protocol. The seven layers are marked 400-412, mirroring the 100-112 and 200-212 marking of the same layers in, respectively, FIGS. 1 and 2. In this implementation, all Lower Layers protocols (layers 406-412) given a common number 401*a* are implemented in hardware, and all Upper Layer protocols (400-404), given a common number 401*b* are implemented in software. A software driver 440 (implemented at a different layer than 214 of FIG. 2) provides the connectivity between the software and the hardware implemented layer protocols. There are two data paths: a first "transmit" or TX data path 420 starting in Application layer 400 and passing through Upper Layer protocols 401b, a first connection 422, driver 440, a second connection 424, Transport layer 406, Network layer 408, and Data Link layer 410 to Physical layer 412; and a second, "receive" or RX data path 430 starting in Physical layer 412 and passing through Data Link layer 410, Network layer 408, Transport layer 406, a third connection 434, driver 440, a fourth connection 436, and through Upper Layer protocols 401b ending in Application layer 400. This implementation suffers from disadvantages described with reference to FIG. 5 below.

FIG. 5 illustrates the problem arising from having one system that comprises an Upper Layers software implementation section 500, and both a hardware implementation 502a of Transport and Network layer protocols, and a software implementation 502b of the same Transport and Network layer protocols. Hardware implementation 502a and software implementation 502b are connected to a first Physical layer 512a and a and second 512b, through respectively a first Data Link layer 510a and a second Data Link layer 510b. Hardware implementation 502a, first Data Link layer 510a and first Physical layer 512a comprise a first hardware block 530. Second Data Link layer 510b and second Physical layer 512b comprise a second hardware block 560. A first driver 540 couples between first hardware block 530 and software implementation section 500. A second driver 514 couples between second hardware block 560 and software section 500 through the software implementation 502b Transport and Network layers. FIG. 5 clearly shows that there are two paths from the Upper Layer protocols (section 500) to the two Physical layers. A left path passes through connection 522a, driver 540 and layers 502a, 510a, and 512a, and a right path passes through connection 522b, software implementation 502b, driver 514 and Data Link layer 510b. However, the OSI model allows only one implementation of the Transport and Network layers as shown in FIG. 1 (106 and 108) and FIG. 2 (206 and 208), while designed to allow implementation of multiple Data Link (210a, b) and Physical (212a, b) layers as shown in FIG. 2. Thus, the implementation shown in FIG. 5 does not meet the OSI specification, and highly complicates the system design. For example, this implementation requires a decision to be taken at the Session layer in section 500, choosing either the left path through connection 522a or the right path through connection 522b for data traffic towards a Physical layer. The Session layer does not have the information needed to make this decision since, according to the OSI model, such information is stored at the Network layer level. Also, having two separate implementations of the Transport and Network layers requires permanent synchronization of the databases of those two layers, in order to keep each implementation aware of decisions made by the other.

FIG. 6 describes in detail a flow chart of a hardware system 600 implementation of block 530 (minus the Physical layer) of FIG. 5. FIG. 6 clearly shows that there is only one transmit (TX) path 620 from the Session layer (not shown) to the Physical layer (not shown), which enters block 600 through a first connection 624, and passes a Transport layer 606, a Network layer 608 and an internal (to block 600) Data Link layer 610, exiting block 600 through a second connection 629. FIG. 6 also clearly shows that there is only one receive (RX) path 630 from the Physical layer to the Session layer, which enters block 600 through a third connection 639, and passes through the internal Data Link, Network and Transport layers, exiting block 600 through a fourth connection 634. Packets processed by the Network layer are said to be sourced from (in the RX path) or directed to (in the TX path) the internal Data Link layer. This hardware configuration does not allow a second (external to block 600) Data Link layer to be connected, since there is only one pair of input/output connections (628/638) between the Network layer and the internal Data Link layer. This limits system 600 to the use of only one (the internal) Data Link layer, limiting the possible number of network connections. A similar problem appears between the Transport and the Network layers. The hardware implementation of the Network layer lacks the flexibility of the software implementation of the same layer, causing stiffness in case of a protocol modification (since the entire protocol is implemented in hardware). For example, a designer may choose to not implement a specific option of the IP protocol, leaving this option to be handled by software running on the host CPU (350 in FIG. 3).

In view of the disadvantages of the hardware implementations above, there is a clear need for, and it would be advantageous to have, hardware implemented network acceleration platforms with enhanced functionality and flexibility, allowing adaptation to changes in existing and future protocols.

SUMMARY OF THE INVENTION

The present invention discloses, in various embodiments, a programmable platform for packet processing acceleration, which offloads Lower Layers protocol processing tasks from a host system, to be performed in a separate hardware system. In particular, the present invention discloses in detail a preferred embodiment of an implementation of the Lower Layers protocols in hardware. The platform of the present invention is referred to hereinafter as Network Traffic Accelerator (NTA) or Any Port Protocol Offload Engine (APPOE). The NTA is operative to offload a host processor, which may be any known processor such as a central processing unit (CPU), a network processing unit, or a dedicated processing unit, removing the need to perform in such a processor network protocols such as (but not limited to) IP, ARP, ICMP, TCP and UDP, referred to collectively as "TCP/IP protocols". The NTA of the present invention may be reprogrammed to support future protocols and changes in currently implemented protocols and functions. The present invention enables a single, preferably hardware instance of the Network and Transport layers to exist in the system, enabling it to process packets sourced by, and packets output to, any Data Link Layer implementation in the system. Advantageously, a single hardware implementation of the Network and Transport layers, with the ability to be connected to multiple Data Link layers, will significantly reduce or offload the CPU tasks, increasing the available CPU processing power for the Upper Layers, and enhancing the overall system performance. The invention also relates to enabling an existent first Network layer implementation to be upgraded, by allowing a second Network layer to process packets that the first Network layer does not support.

According to the present invention, there is provided a method for processing packets in a TCP/IP communications network comprising the steps of providing a network traffic accelerator (NTA) implementing internally an internal transport layer, an internal network layer and at least one internal data link layer, the internal transport, network and at least one data link layers connected along an internal receive path; inputting packets from an external data link layer into the internal network layer; and processing the packets.

According to one feature in the method for processing packets in a TCP/IP communications network of the present invention, at least one of the internal transport, network and data link layers is implemented in hardware.

According to the present invention, there is provided a method for processing packets in a communications network implementing a TCP/IP protocol, comprising providing a network traffic accelerator (NTA) implementing internally an internal transport layer, an internal network layer and at least one internal data link layer, the internal transport, network and at least one data link layers connected along an internal receive path; processing in the at least one internal data link layer a packet originating from a physical layer; checking whether the packet is supported by a protocol of the internal network layer; and based on the result of the checking, processing the packet in a network layer selected from the group consisting of the internal network layer and an external network layer.

According to one feature in the method for processing packets in a communications network implementing a TCP/IP protocol, at least one of the internal transport, network and data link layers is implemented in hardware.

According to the present invention, there is provided in a first embodiment a method for accelerated packet processing in a TCP/IP communications network, comprising providing a network traffic accelerator (NTA) implementing internally an internal transport layer, an internal network layer and at least one internal data link layer, the internal transport, network and at least one data link layers connected along an internal transmit path; processing in the internal transport layer a packet originating from a session layer; checking whether the packet is supported by a protocol of the internal network layer; based on the result of the checking, processing the packet in a network layer selected from the group consisting of the internal network layer and an external network layer; forwarding the packet to the at least one internal data link layer for a check; and based on the check, processing the packet in a data link layer selected from the group consisting of the at least one internal data link layer and an external data link layer.

According to one feature in the method for accelerated packet processing in a TCP/IP communications network, at least one of the internal transport, network and data link layers is implemented in hardware.

According to the present invention, there is provided in a second embodiment a method for accelerated processing of a packet in a TCP/IP communications network comprising the steps of: providing a network traffic accelerator (NTA) implementing an internal transport layer, an internal network layer and at least one internal data link layer, the internal transport, network and at least one data link layer connected along an internal transmit path; inputting a protocol-unsupported packet from an external data link layer into the internal network layer; and sending the protocol-unsupported packet from the internal network layer to be processed externally in an external software network layer, the external processing resulting in a protocol-processed packet.

According to one feature in the method for accelerated packet processing in a TCP/IP communications network, at least one of the internal transport, network and data link layers is implemented in hardware.

According to the present invention, there is provided a network traffic accelerator (NTA) comprising: an internal transport layer, an internal network layer and at least one internal data link layer connected along an internal transmit path and an internal receive path; and first means for processing a packet traveling along the receive path, the packet originating from a section layer selected from the group consisting of an internal physical layer and an external physical layer.

According to one feature in the NTA of the present invention, the NTA further comprises second means for processing a packet traveling along the transmit path, the packet origi-nating from a physical layer selected from a group consisting of an internal section layer and an external section layer.

According to another feature in the NTA of the present invention, at least one of the internal transport, network and data link layers is implemented in hardware.

According to the present invention, there is provided a TCP/IP communications network, a system for packet processing comprising: a processing unit; a hardware network traffic accelerator (NTA) unit implementing a hardware network layer protocol, a hardware transport layer protocol and a hardware data link protocol of a seven layer OSI model thereby providing a NTA TCP/IP protocol, the NTA separate from the processing unit; and means to process in the processing unit protocol-unsupported packets, whereby packets unsupported by the NTA TCP/IP protocol and received in the hardware network layer are sent to the processing unit for processing to yield network layer protocol-processed packets, the protocol-processed packets returned to the NTA for further TCP/IP protocol-supported processing.

According to one feature in the system for packet processing according to the present invention, the system further comprises means to connect the hardware network layer to an external data link layer, whereby the protocol-unsupported packets may originate in the external data link layer.

BRIEF DESCRIPTION OF THE DRAWINGS

The invention is herein described, by way of example only, with reference to the accompanying drawings, wherein:

FIG. 7 shows a preferred embodiment of a Network Traffic Accelerator (NTA) according to the present invention;

FIG. 8 shows a preferred system implementation using the NTA described in FIG. 7a;

DESCRIPTION OF THE PREFERRED EMBODIMENTS

Figure 6:
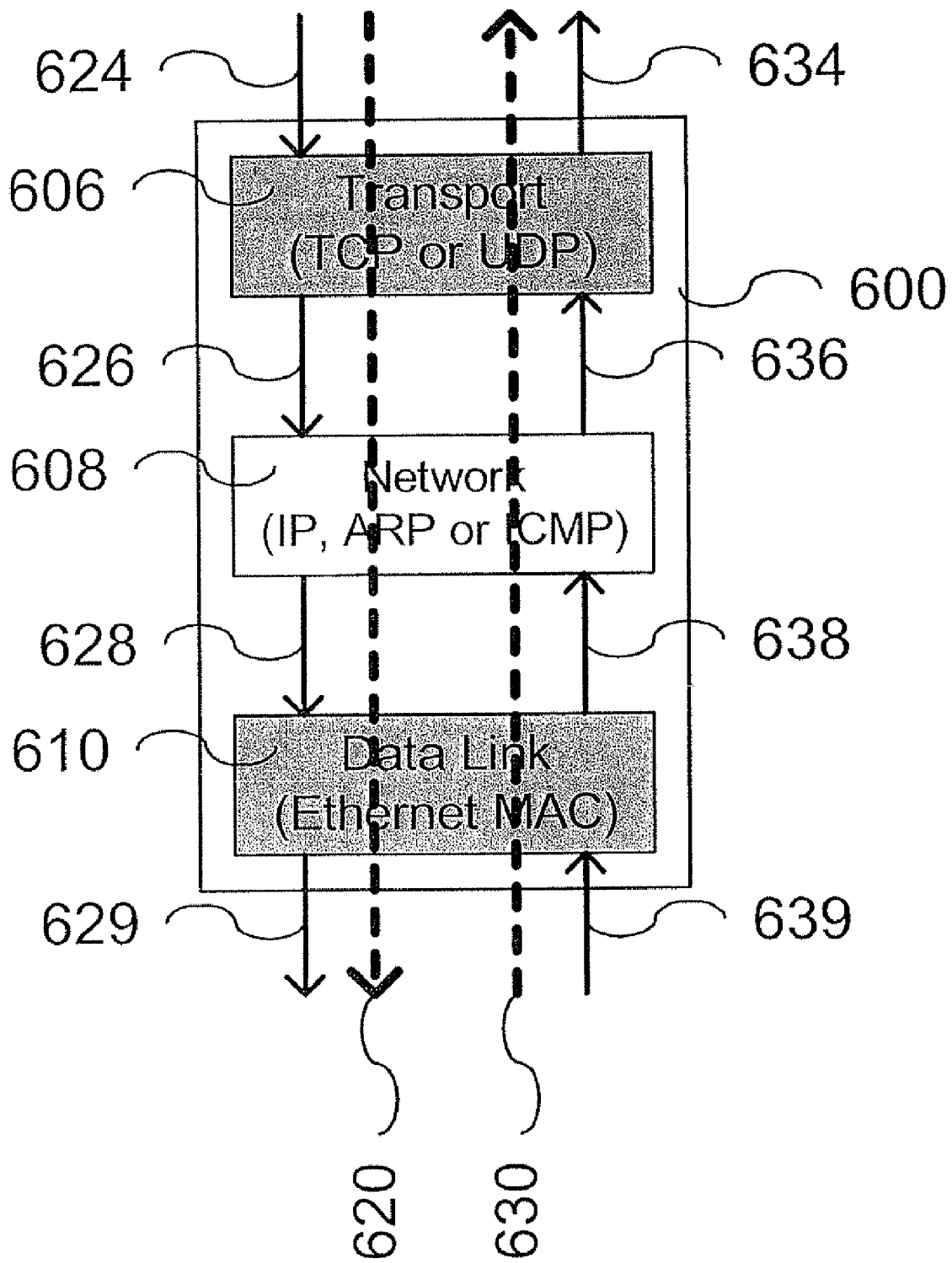
FIG. 6 shows schematically hardware implemented Transport, Network and Data Link layers.
Figure 7A:
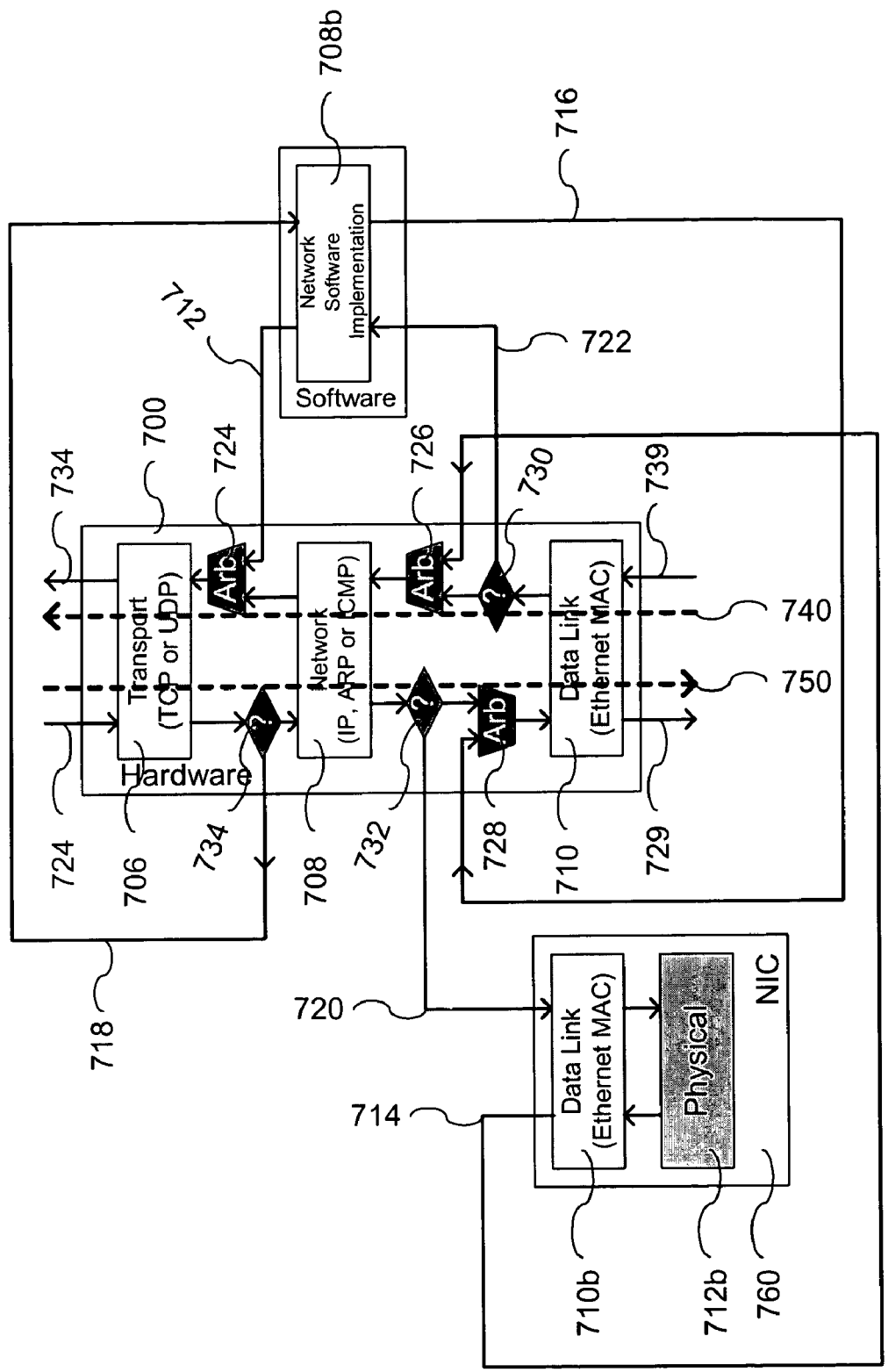
FIG. 7a shows

FIG. 7a shows a preferred embodiment of a Network Traffic Accelerator (NTA) 700, which implements internally in hardware a Transport layer 706, a Network layer 708 and an internal Data Link layer 710 as well as additional elements described below. NTA 700 has all the elements, and can perform all the functions of system 600 of FIG. 6, but comprises additional elements that provide new and advantageous functionalities. Specifically, NTA 700 can perform the processing of internally sourced packets passing through the internal Data Link layer as described in FIG. 6, and, in addition, processing of externally sourced packets from an external Data Link layer. The additional elements include six additional connections 712, 714, 716, 718, 720 and 722, three arbiters 724, 726 and 728, and three switches 730, 732 and 734. These additional elements enhance the functionality of the system by allowing it to process data from paths other than an RX path 740 (630 in FIG. 6) and a TX path 750 (620 in FIG. 6) between Physical and Session layers. Note that although NTA 700 is described with respect to all three layers being implemented in hardware, it would be obvious to anyone skilled in the art that one or more of the layers may be implemented in software, and that, in general, the implementation may be any software/hardware combination of internal Transport, Network and Data Link layers. Thus, it is understood that a "hardware" implementation of the three layers according to the present invention covers all such combinations.

A typical use of NTA 700 that explains and emphasizes the use of some or all the additional elements and the new functionalities is described in the following example: suppose that internal NTA Network layer 708 receives a data packet that it does not know how to handle from any Data Link layer. Suppose the packet was generated by a different protocol than those supported by the internal NTA Network layer 708, or is a packet that the designer of this system intentionally left out of the scope of the internal Network layer, e.g. an IP fragment packet. Such packets are referred to generically hereafter as "protocol-unsupported packets". FIG. 7 shows the behavior of protocol-unsupported packets merged in the RX path and in the TX path. In FIG. 7, a protocol-unsupported packet will enter RX path 740 at connection 739, will be processed by Data Link layer 710 and output toward switch 730. Switch 730 has previous knowledge and knows how to recognize packets supported by 708, and therefore will recognize this packet as one that the internal Network layer 708 does not know how to handle, and forward it through connection 722 to an external Network layer 708b implementation. The packet will undergo Network layer processing in 708b to yield a protocol-processed packet, and will return as a protocol-processed packet through connection 712 to arbiter 724. Arbiter 724 is preferably a round robin arbiter that allows maximum fairness between data coming from internal Network layer 708 and external Network layer 708b to Transport layer 706. The packet is then processed in the internal Transport Layer 706 and output through output 734 towards the CPU.

Figure 1:
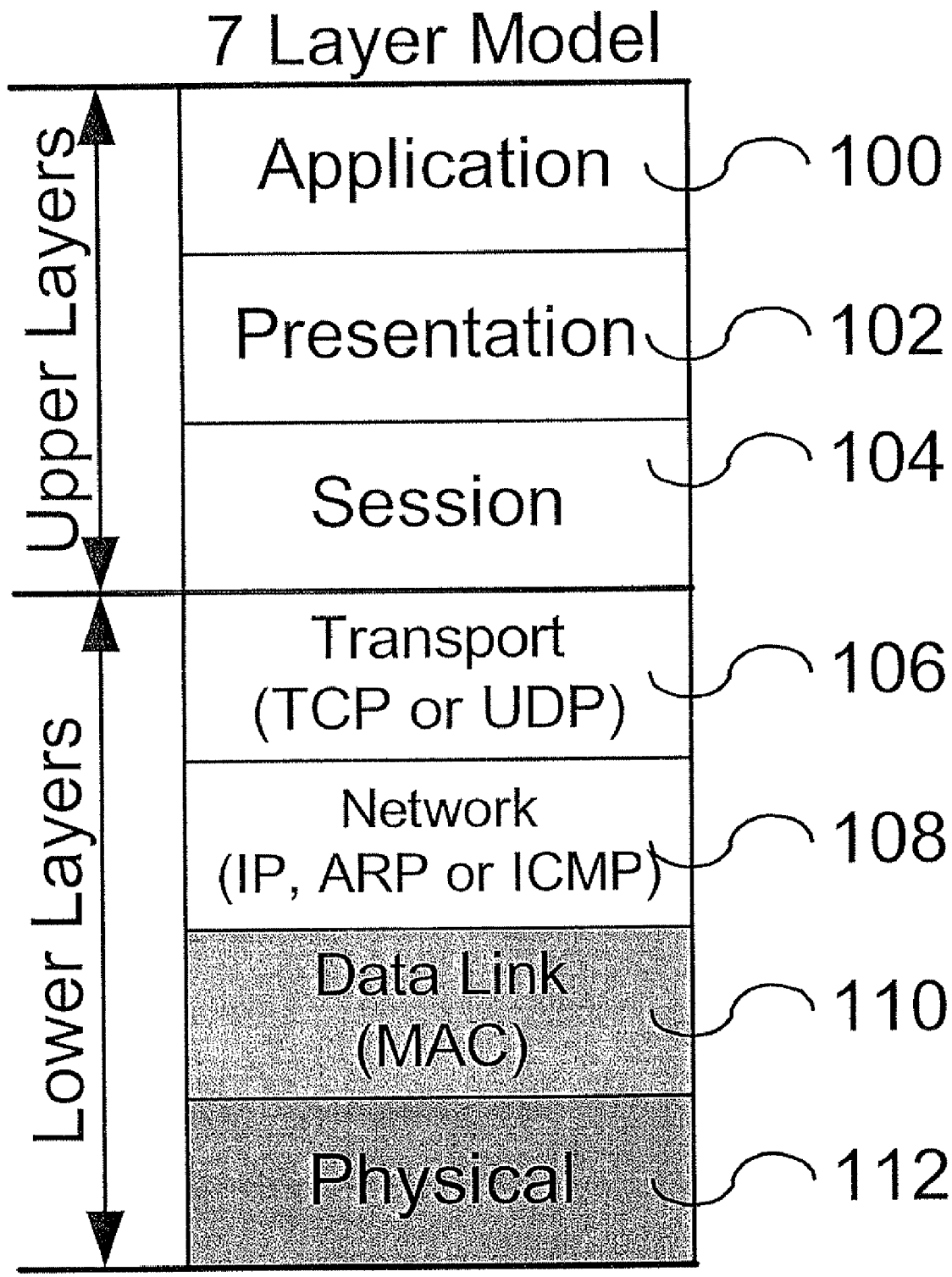
FIG. 1 shows schematically a 7 layer OSI model.
Figure 2:
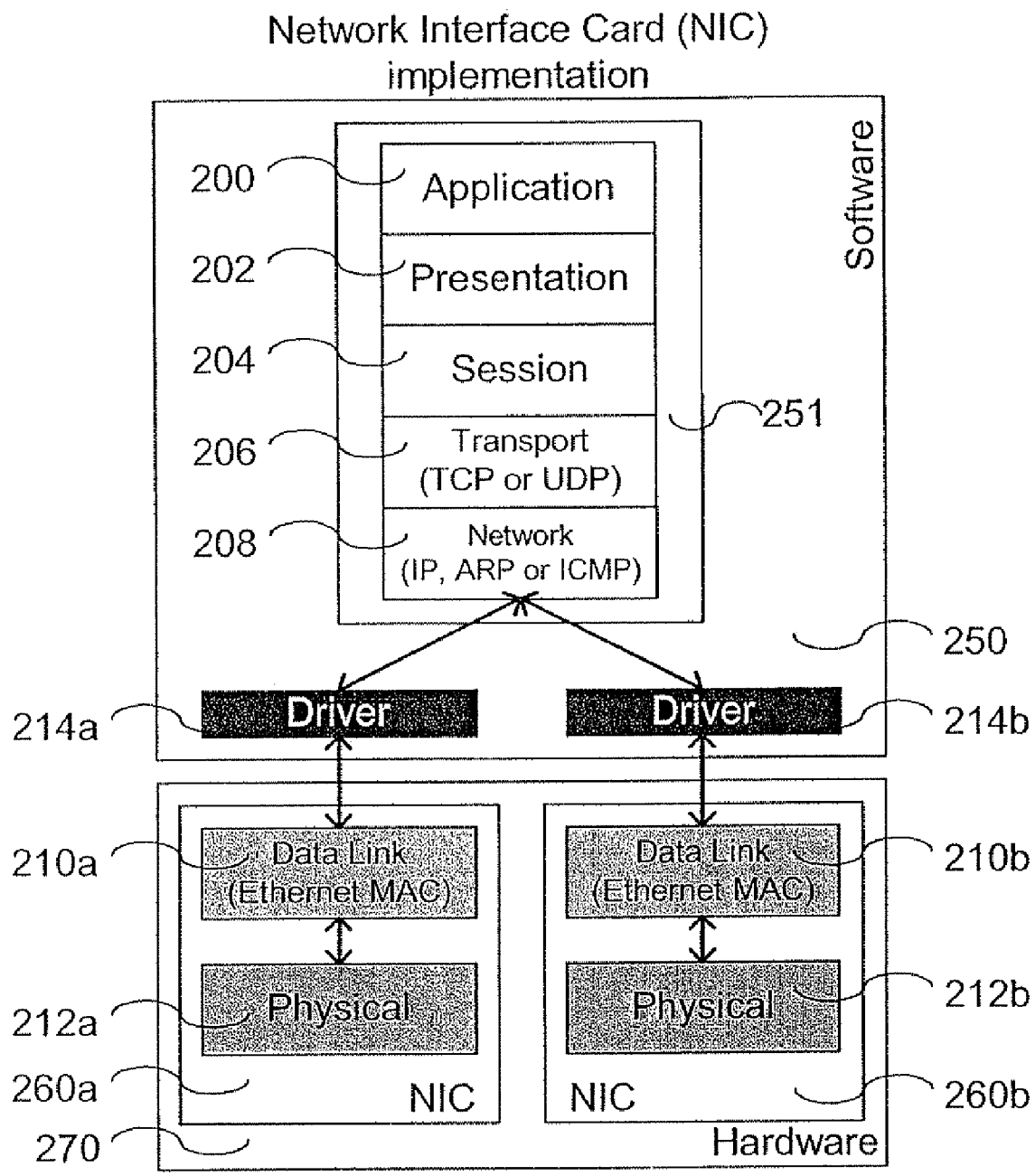
FIG. 2 shows schematically a Network Interface Card (NIC) implementation at the system level.
Figure 3:
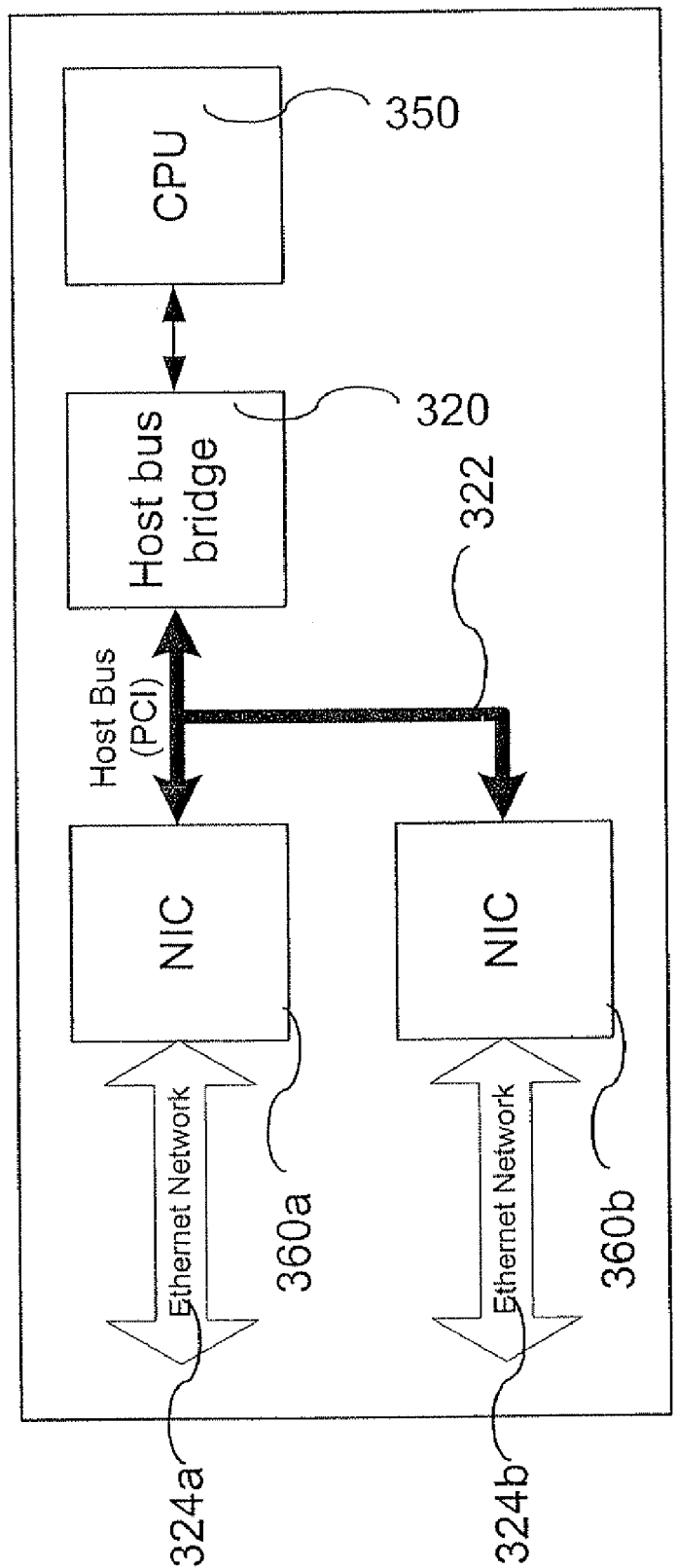
FIG. 3 shows a prior art hardware implementation of a NIC in a system.
Figure 4:
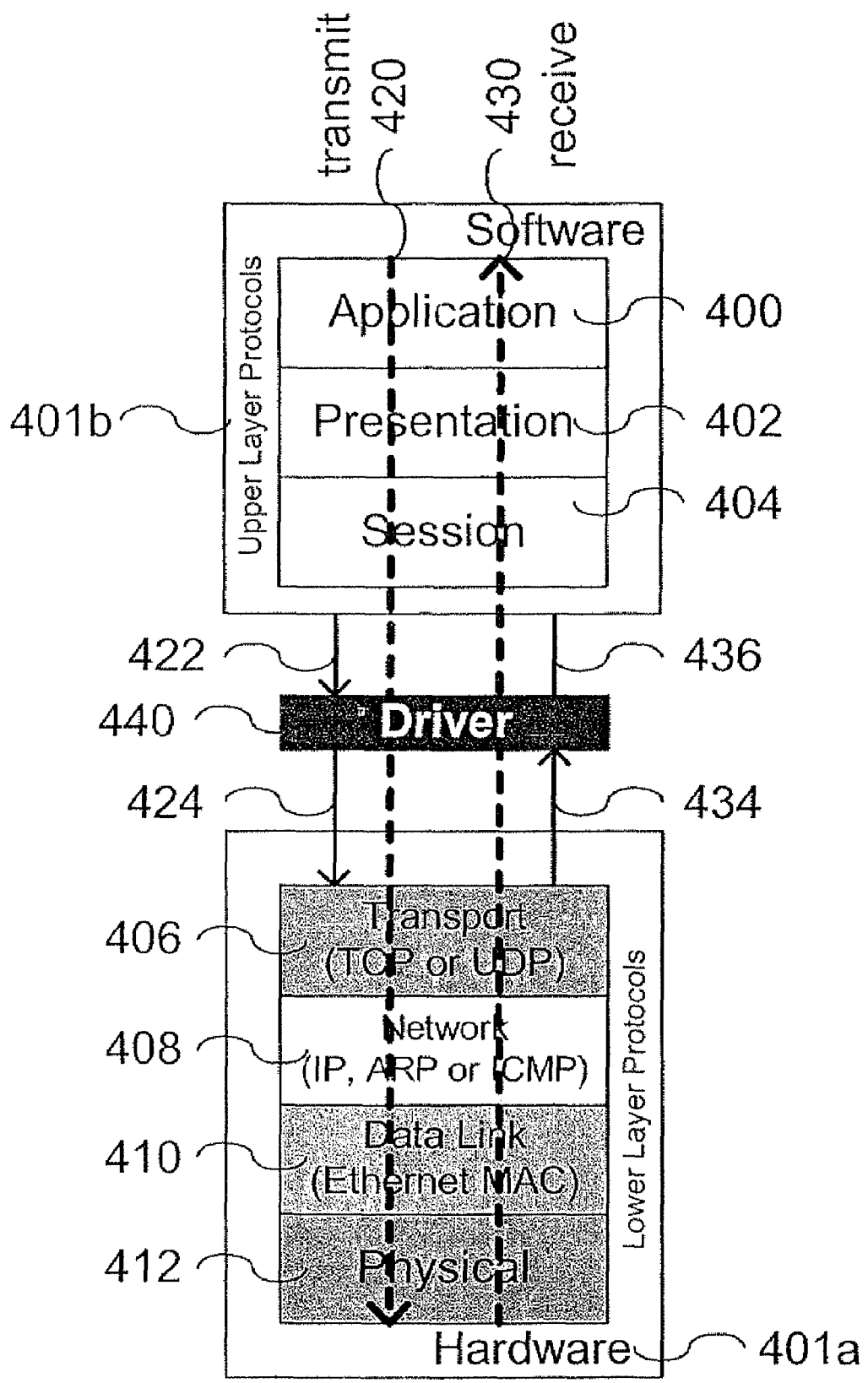
FIG. 4 shows a typical prior art hardware TCP/IP implementation.

In a similar way, as shown in FIG. 7a, a protocol-unsupported packet on TX path 750 will be forwarded by switch 734 through connection 718 to software Network layer 708b. The packet will be then processed by the software Network layer and forwarded through connection 716 to arbiter 728. Arbiter 728 is preferably a round robin arbiter, allowing maximum fairness between data coming from hardware Network layer 708 and software Network layer 708b to Data Link layer 710. The packet is then processed by the Data Link layer 710 protocol in a normal manner. This system has the flexibility lacking in the one showed in FIG. 4, and allows changes to be introduced in a software implemented Network layer.

As clearly shown in FIG. 7a, NTA 700 allows data to be merged into the RX path from different sources than just the NTA Data Link layer, for example from an external Data Link layer 710b implemented externally in a Network Interface Card (NIC) 760. NIC 760 also comprises a second hardware Physical layer 712b. The input of data from NIC 760 into the RX path occurs through connection 714 and arbiter 726, while the output of data to NIC 760 from the TX path occurs through connection 720 and switch 732. Advantageously, this configuration allows the internal NTA Network and Transport layers to process data from both the internal Data Link layer and the external NIC. Arbiter 726 is preferably a round robin arbiter that allows maximum fairness between data coming from the internal Data Link layer and the external NIC (i.e. the NIC Physical layer through the NIC Data Link layer of the) to the internal Network layer.

Figure 7B:
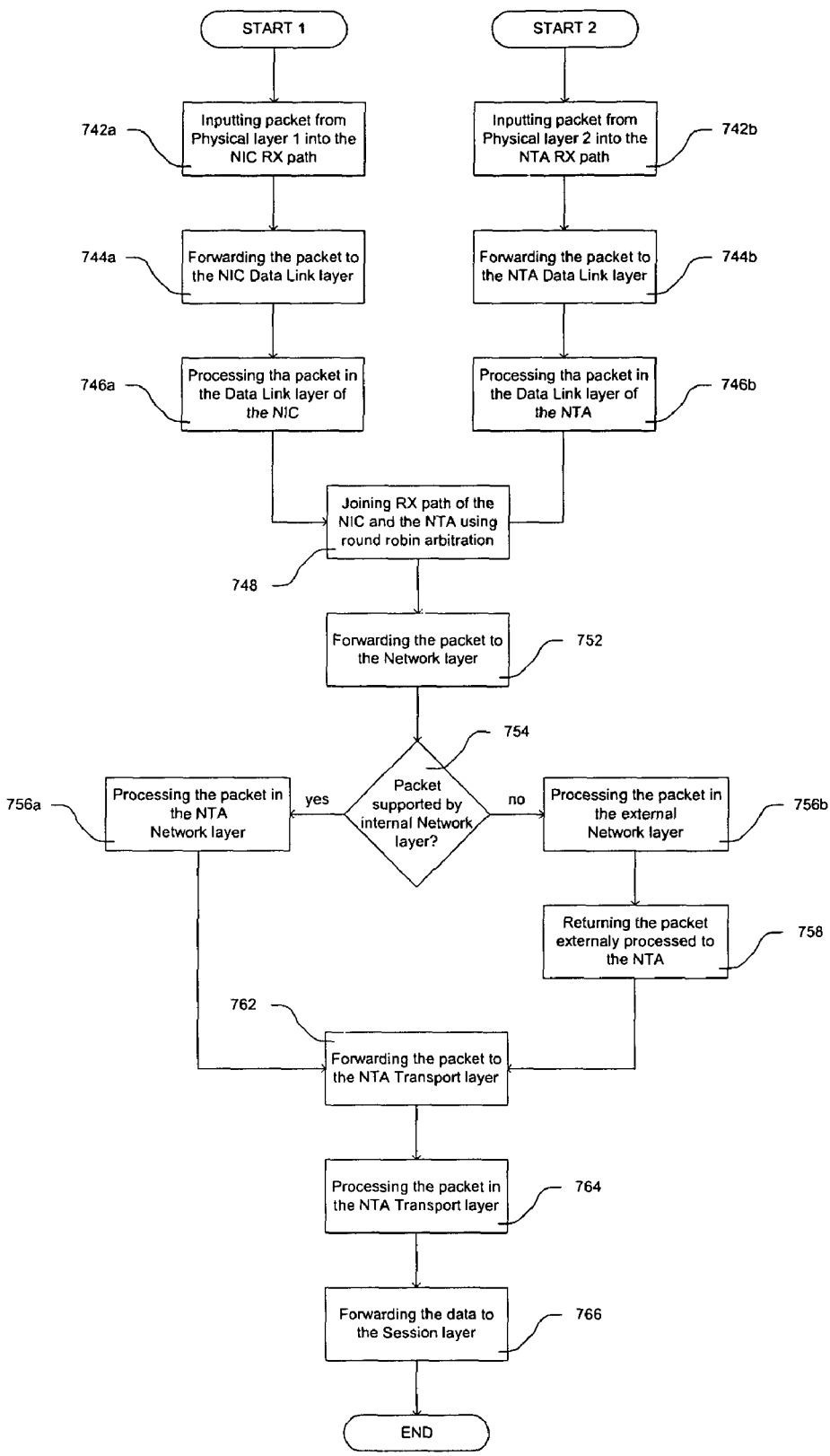
FIG. 7b shows a flow chart of one embodiment of the method for processing packets in a TCP/IP communications network according to the present invention.

The steps of a preferred embodiment of the method for processing packets in a TCP/IP communications network according to the present invention, as referring to the data flow and merging in the NTA RX path is explained in more detail with reference to FIG. 7b. In the left path starting with Start 1, a packet #1 is input in step 742a into an NIC RX path (not shown) from a first Physical layer, e.g. (external, in the NIC) layer 712b. The packet is forwarded to the NIC data Link layer (i.e. 710b) in step 744a, where it is processed in step 746a. In the right path starting with Start 2, a packet #2 sourced from a second Physical layer, e.g. one belonging to the NTA, is input into the NTA RX path in step 742b, forwarded to the NTA Data Link layer (i.e. 710) in step 744b, and processed therein in step 746b. Packet #1 joins the RX path of the NTA in step 748 using preferably round robin arbitration by the arbiter. Each packet is forwarded to the internal hardware NTA Network layer in step 752, and a check is made to see if the packets are supported by the internal Network layer protocol in step 754. If yes (packet is internal protocol-supported), the packet is processed internally in the NTA Network layer. If not (packet is protocol-unsupported), the packet is sent in step 756b for external processing in an externally implemented Network layer, e.g. inside a CPU, to obtain a protocol-processed packet. The external protocol-processed packet is returned to the NTA in step 758, joining an internally processed packet on the RX path, all packets forwarded now to the internal NTA Transport layer in step 762. Each packet is processed in the NTA Transport layer in step 764, and forwarded to the NTA Session layer in step 766, ending the processing sequence.

Figure 7C:
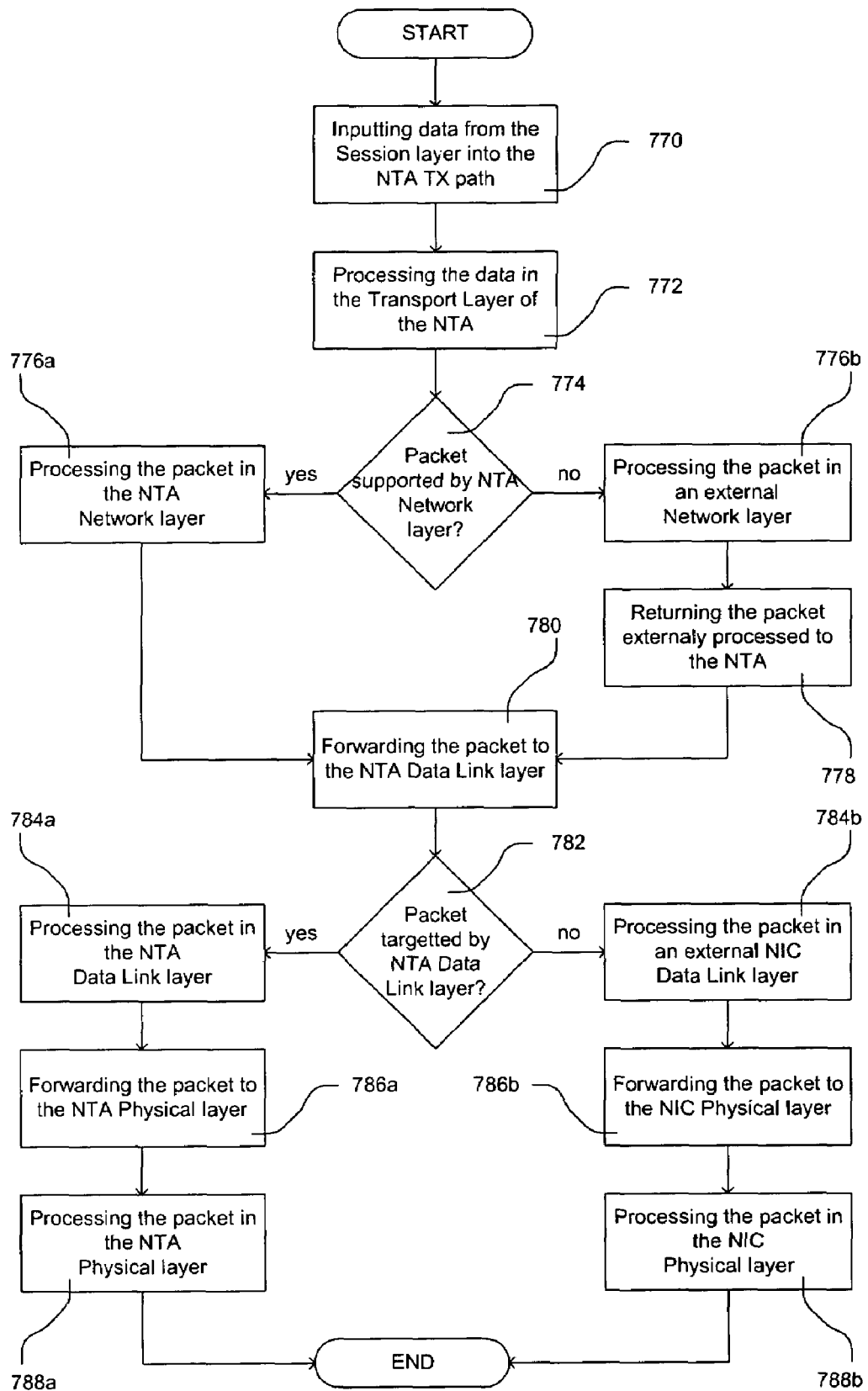
FIG. 7c shows a flow chart of another embodiment of the method for processing packets in a TCP/IP communications network according to the present invention.

The steps of a preferred embodiment of the method for processing packets in a TCP/IP communications network according to the present invention, as referring to the data flow and merging in the NTA TX path, is explained in more detail with reference to FIG. 7c. Data is inputted into the TX path of the NTA from the NTA Session layer in step 770. The data is processed in the NTA hardware Transport layer in step 772, and a check is run in step 774 to see if the packet is supported by the internal Network layer protocol. If yes (packet protocol-supported) the packet is processed internally in the NTA Network layer in step 776a. If not (packet is protocol-unsupported), the packet is sent for external processing in an external Network layer in step 776b, and returned as a protocol processed packet to the NTA in step 778. Both internally and externally processed packets are then forwarded to a Data Link layer in step 780. The packet may now be processed either in an internal (NTA) or an external (e.g. NIC) Data Link layer. The decision is made in step 782, which checks whether a packet's destination is the NTA Data Link layer or not. If yes, the packet is processed internally in the NTA Data Link layer in step 784a, forwarded to the NTA Physical layer in step 786a, and processed in the NTA Physical layer in step 788a. If not, the packet is sent for external processing in the NIC Data Link layer in step 784b, forwarded to the NIC Physical layer in step 786b, and processed in the NIC Physical layer in step 788b, after which the sequence is finished.

Figure 5:
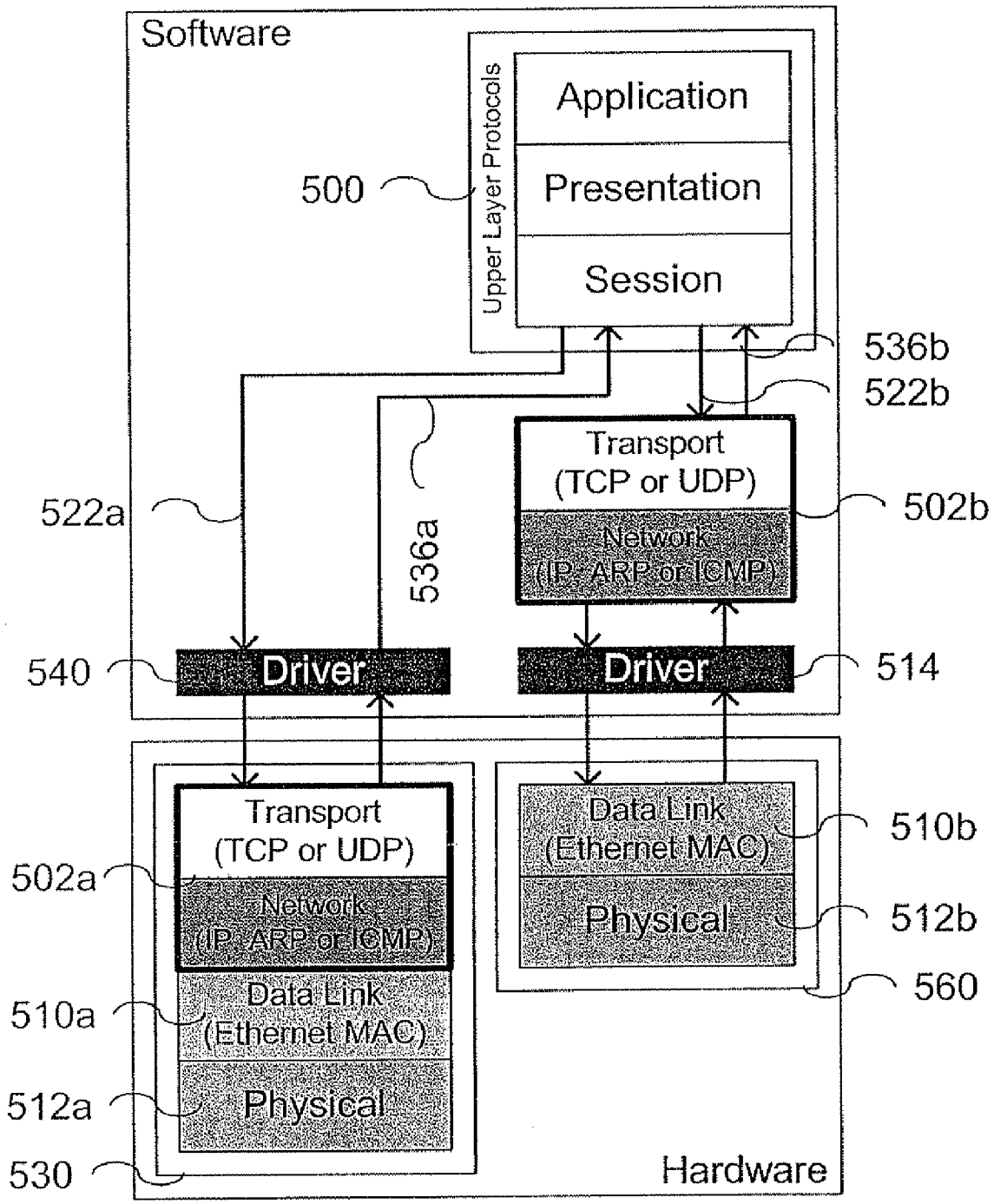
FIG. 5 shows schematically a prior art hardware and software implementation of Lower Layer protocols.
Figure 8:
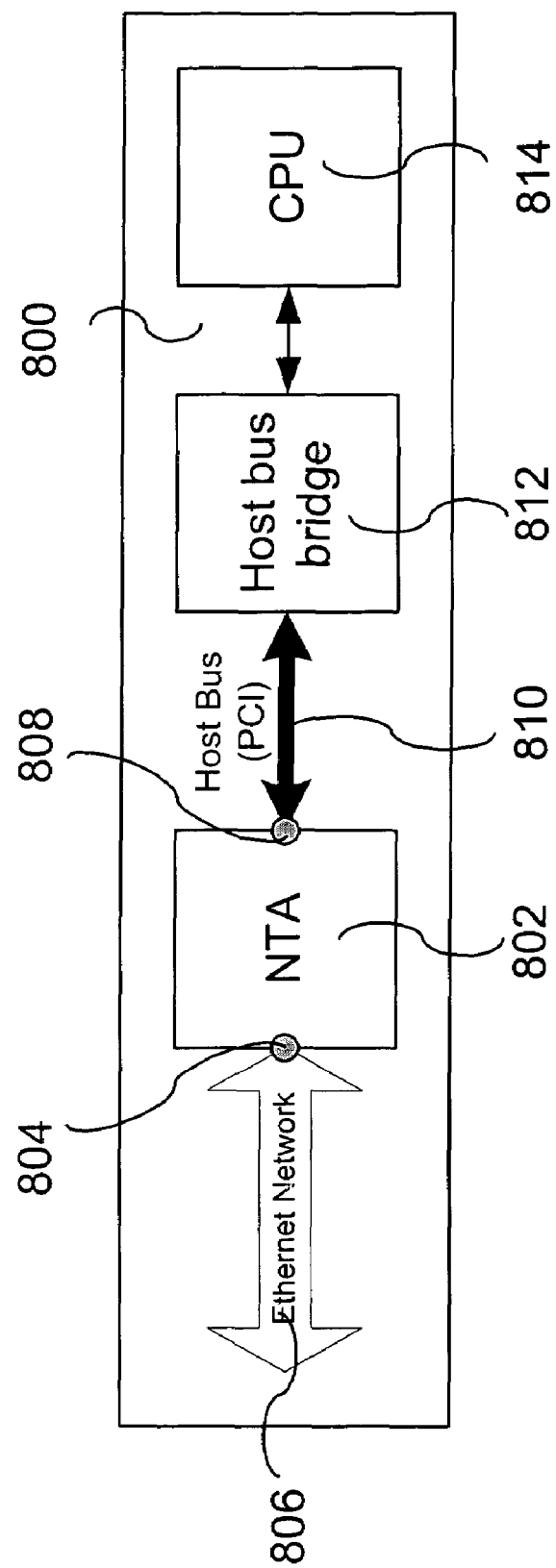

FIG. 8 shows a preferred system implementation using the NTA described in FIG. 7. An NTA 802 is connected at a left port 804 to an Ethernet network 806 and at a right port 808, through a PCI bus 810 to a host bus bridge 812. The host bus bridge connects between NTA 802 and a CPU 814, which may be any CPU known in the art, for example Intel Pentium. In this embodiment, the PCI bus implements logical connections 724, 734, 718, 712, 716 and 722 of FIG. 7 between the NTA and the CPU. Connections 720 and 714 of FIG. 7 are not used in this example. The NTA implements block 700 and the CPU implements block 708b of FIG. 7 and Upper Layers protocols section 500 of FIG. 5. A packet unsupported by the hardware Network layer of the NTA, for example the same IP fragmented packet of the example in FIG. 7, enters the NTA through left port 804. Assuming that the Network layer in NTA 802 does not support IP fragments, the packet is forwarded through the PCI bus and the host bus bridge to the CPU. The CPU resolves the IP fragmentation and returns the de-fragmented packet to the NTA through the bridge and the PCI bus. The NTA then passes the packet through its Transport layer, processes it, and sends the data back to the CPU through the bridge.

Figure 9:
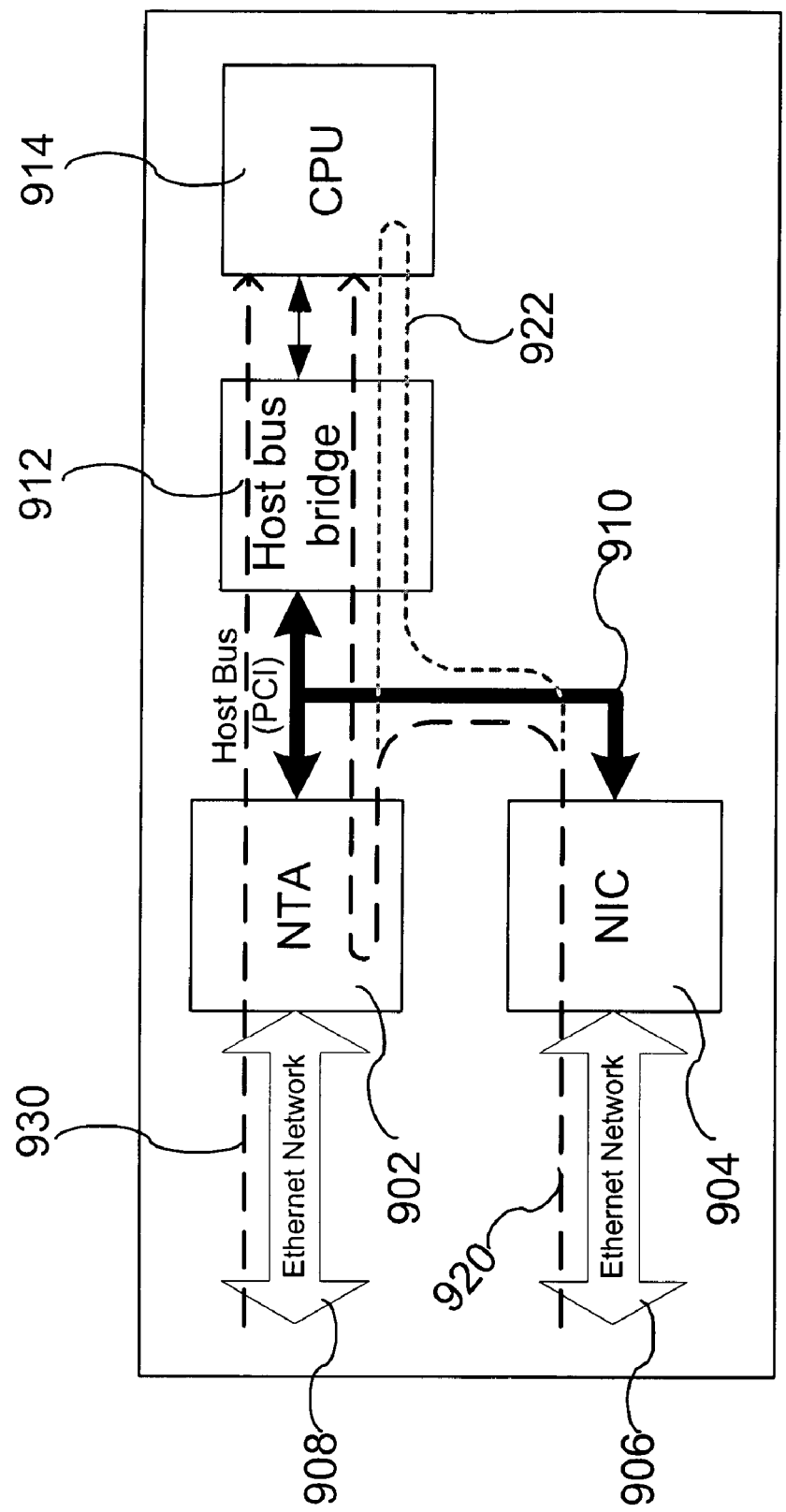
FIG. 9 shows a preferred embodiment of a system implementing a Network Traffic Accelerator (NTA) and NIC according to the present invention

FIG. 9 shows a preferred embodiment of a system 900 comprising a NTA 902 similar to NTA 802 of FIG. 8, a Network Interface Card (NIC) 904, two network interfaces, preferably Ethernet network interfaces 906 and 908, a host (preferably PCI) bus 910, a host bus bridge 912 and a CPU 914. As mentioned, the "Any Port Protocol Offload Engine" (APPOE) name signifies the fact that the NTA can offload the protocol processing of packets from CPU 914, when the packets originate from any port (i.e. both Ethernet connections 906 and 908). Logical output 720 and input 714 of FIG. 7 are used to connect the hardware Data Link layer 710b of the NIC to the hardware Network Layer of the NTA. Logical connections 720 and 714 are made through PCI bus 910. An RX data path 920, from Ethernet network interface 906 to the CPU, passes through the Network and Transport layers of the NTA. The traffic between the NTA and the NIC may be kept local (only on the left side of the bridge 912, i.e. only on PCI bus 910), or the CPU may be involved in a data transfer path 922 between the NTA and the NIC. In case the CPU is on path 922, packets will travel from the NIC to the CPU along the path, i.e. through the bridge; the CPU will forward the packets to the Network layer of the NTA also through the bridge, the NTA will pass and process the packets through its hardware Network and Transport layers, and then send the resulting data back to the CPU through the bridge. The TX data path will have the reverse direction of the RX path. Advantageously, ingress packets (packets on the RX path), arriving from an attached media access controller (MAC), (in this case the Data Link layer of NIC 904) or from the APPOE (NTA 902) are processed, de-capsulated from all Lower Layers network protocols, and forwarded to the CPU for Upper Layer protocols processing, highly reducing the CPU power spent on processing the Lower Layer protocols. Egress packets (packets on the TX path) are processed by the Upper Layer protocols on the CPU, then sent to the NTA where the packets are encapsulated within Transport and Network layer protocols, and forwarded through the attached MAC (in this case the Data Link layer of NIC 904) or the Data Link layer of the APPOE (NTA 902) to the network. The Network layer processing can be done either by the hardware Network layer 708 (FIG. 7a) implemented in the NTA, or by software implemented Network 708b layer.

In summary, the present invention provides a simple and efficient implementation of a network protocol processing method specialized in processing the Network and Transport layers protocols, in a system that was previously built to incorporate only hardware implementations of the Physical and Data Link layers. A system comprising an NTA (APPOE) according to the present invention may be implemented in various network elements and functions, including but not limited to general purpose computers (workstations and servers), switches, routers, gateways, network storage solutions such as IP Storage, FireWall applications, and boxes implementing compression and decompression algorithms.

All publications and patents mentioned in this specification are herein incorporated in their entirety by reference into the specification, to the same extent as if each individual publication or patent was specifically and individually indicated to be incorporated herein by reference. In addition, citation or identification of any reference in this application shall not be construed as an admission that such reference is available as prior art to the present invention.

While the invention has been described with respect to a limited number of embodiments, it will be appreciated that many variations, modifications and other applications of the invention may be made. What has been described above is merely illustrative of the application of the principles of the present invention. Those skilled in the art can implement other arrangements and methods without departing from the spirit and scope of the present invention.

What is claimed is:

1. A method for processing packets in a communications network implementing a TCP/IP protocol, comprising:
   a. providing a network traffic accelerator (NTA) implementing internally an internal transport layer, an internal network layer and at least one internal data link layer, said internal transport, network and at least one data link layers connected along an internal receive path;
   b. processing in said at least one internal data link layer a packet originating from a physical layer;
   c. round robin arbitrating the joining on said receive path of said packets originating from internal and external physical layers,
   d. forwarding said packets to said internal network layer;
   e. checking whether said packet is supported by a protocol of said internal network layer; and
   f. based on the result of said checking, processing said packet in a network layer selected from the group consisting of said internal network layer and an external network layer.

2. The method of claim 1, wherein said result of said checking includes finding that said packet is protocol-supported, whereby said protocol-supported packet is processed in said internal network layer.

3. The method of claim 1, wherein said result of said checking includes finding that said packet is protocol-unsupported, whereby said protocol-unsupported packet is processed in said external network layer to yield a protocol-processed packet.

4. The method of claim 3, wherein said protocol-unsupported packets include IP fragment packets.

5. The method of claim 3, wherein said step of externally processing to yield a protocol-processed packet is followed by the step of returning said protocol-processed packet to said NTA for further processing in said internal transport layer.

6. The method of claim 1, wherein at least one of said internal transport, network and data link layers is implemented in hardware.

7. A network traffic accelerator comprising:
   a. an internal transport layer, an internal network layer and at least one internal data link layer connected along an internal transmit path and an internal receive path; and b. first means for processing a packet traveling along said receive path, said packet originating from a section layer selected from the group consisting of an internal physical layer and an external physical layer, wherein said packet is selected from the group consisting of a protocol-support packet and a protocol unsupported packet, wherein each said packet is selected from the group of an external packet and an internal packet, and wherein said first means include a first arbiter connected in said internal return path to said internal network layer and operative to perform round robin arbitration between said external and internal packets and a first switch connected in said internal return path between said first arbiter and said internal data link layer, said first switch operative to direct a packet for processing in a network layer selected from the group of said internal network layer and an external network layer.

8. The network traffic accelerator of claim 7, wherein said packet directed for processing in an external network layer is returned as a protocol processed packet to the network traffic accelerator, the accelerator further comprising a second arbiter connected in said internal return path between said internal network and transport layers, said second arbiter operative to merge said protocol processed packet back into said internal return path.

9. A network traffic accelerator comprising:
a. an internal transport layer, an internal network layer and at least one internal data link layer connected along an internal transmit path and an internal receive path;
b. first means for processing a packet traveling along said receive path, said packet originating from a section layer selected from the group consisting of an internal physical layer and an external physical layer;
c. second means for processing a packet traveling along said transmit path, wherein said packet is selected from the group consisting of a protocol-supported packet and a protocol unsupported packet and originates from a physical layer selected from a group consisting of an internal section layer and an external section layer;
wherein said second means include a second switch connected in said internal transmit path between said internal transport and network layers, said second switch operative to direct a packet for processing in a network layer selected from the group of said internal network layer and an external network layer.

10. The network traffic accelerator of claim 9, wherein said second means further include a third switch connected in said internal transmit path to said internal network layer and operative to direct a packet for processing in an external data link layer.

11. The network traffic accelerator of claim 10, wherein said packet directed to said external network layer for processing becomes a protocol-processed packet, wherein said second means further include a third arbiter connected in said transmit path between said third switch and said internal data link layer, and wherein said third arbiter is operative to merge said protocol-processed packet back into said internal return path.

\* \* \* \* \*